US010997731B2

(12) United States Patent
Chiew et al.

(10) Patent No.: US 10,997,731 B2
(45) Date of Patent: May 4, 2021

(54) MOTION VECTOR VISION SYSTEM INTEGRITY MONITOR

(71) Applicant: Rockwell Collins, Inc., Cedar Rapids, IA (US)

(72) Inventors: Daniel Y. Chiew, Portland, OR (US); Elisabeth Barnes, Portland, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 9 days.

(21) Appl. No.: 16/441,280

(22) Filed: Jun. 14, 2019

(65) Prior Publication Data

US 2021/0097697 A1    Apr. 1, 2021

(51) Int. Cl.
*G06T 7/215* (2017.01)
*G01C 23/00* (2006.01)
*G01C 21/16* (2006.01)
*G02B 27/01* (2006.01)

(52) U.S. Cl.
CPC ............ *G06T 7/215* (2017.01); *G01C 21/165* (2013.01); *G01C 23/005* (2013.01); *G02B 27/01* (2013.01)

(58) Field of Classification Search
CPC .... G06T 7/215; G01C 21/165; G01C 23/005; G02B 27/01
See application file for complete search history.

(56) References Cited

U.S. PATENT DOCUMENTS

| | | | |
|---|---|---|---|
| 9,842,254 B1* | 12/2017 | Brailovskiy | H04N 5/2258 |
| 10,169,847 B1* | 1/2019 | Heineck | B64D 47/08 |
| 2008/0238770 A1* | 10/2008 | Rofougaran | G01S 19/49 |
| | | | 342/357.32 |
| 2010/0027663 A1* | 2/2010 | Dai | H04N 19/44 |
| | | | 375/240.16 |
| 2011/0019740 A1* | 1/2011 | Saito | H04N 19/176 |
| | | | 375/240.13 |
| 2011/0169957 A1* | 7/2011 | Bartz | G06T 1/0007 |
| | | | 348/149 |
| 2011/0206236 A1* | 8/2011 | Center, Jr. | G06T 7/579 |
| | | | 382/103 |
| 2011/0301901 A1* | 12/2011 | Panagas | G01C 25/005 |
| | | | 702/104 |

(Continued)

OTHER PUBLICATIONS

Author Unknown, "Head-up display", Wikipedia, Version from Apr. 2019. (Year: 2019).*

*Primary Examiner* — Aaron W Carter
(74) *Attorney, Agent, or Firm* — Suiter Swantz pc llo

(57) ABSTRACT

A system and method. The system may include a display, an image generator configured to output a stream of image data, an aircraft state sensor configured to output aircraft state data, and at least one processor. The at least one processor may be configured to: receive the stream of image data; compute an optical flow on the stream of the image data resulting in image-based motion vectors (MVs); receive the aircraft state data; compute expected MVs based on the aircraft state data; compare the expected MVs with the image-based MVs; determine whether at least some of the stream of the image data fails a predetermined assurance level based on a comparison of the expected MVs with the image-based MVs; and upon a determination that at least a portion of the stream of the image data fails the predetermined assurance level, transmit or implement a system response.

19 Claims, 4 Drawing Sheets

(56) References Cited

U.S. PATENT DOCUMENTS

| | | | |
|---|---|---|---|
| 2014/0321548 A1* | 10/2014 | Park | H04N 19/139 |
| | | | 375/240.16 |
| 2016/0320493 A1* | 11/2016 | Wu | G01S 19/51 |
| 2018/0278847 A1* | 9/2018 | Stec | H04N 5/23254 |
| 2018/0299900 A1* | 10/2018 | Bae | G06K 9/6202 |
| 2019/0026572 A1* | 1/2019 | Theodosis | G06K 9/00805 |
| 2019/0346269 A1* | 11/2019 | Mohr | G01C 21/165 |

* cited by examiner

MOTION VECTOR VISION SYSTEM INTEGRITY MONITOR

BACKGROUND

Vision systems are central to low-visibility operations (e.g., take-off and landing), which require higher integrity. These vision systems typically utilize devices (e.g., graphics processing units (GPUs) and camera cores) which often have limited design information available and no design assurance level. In order to use these components, the components must be monitored to detect hazardously misleading information in certified avionic solutions. Current solutions require device specific monitors, which must be re-designed and implemented as components go obsolete. Current image monitoring methods are costly since they are specific to each core or focal plane array's (FPA's) low-level detail design.

SUMMARY

In one aspect, embodiments of the inventive concepts disclosed herein are directed to a system. The system may include a display, a sensor configured to output a stream of image data, an aircraft state sensor configured to output aircraft state data, and at least one processor. The at least one processor may be configured to: receive the stream of image data; compute an optical flow on the stream of the image data resulting in image-based motion vectors (MVs); receive the aircraft state data; compute expected MVs based on the aircraft state data; compare the expected MVs with the image-based MVs; determine whether at least some of the stream of the image data fails a predetermined assurance level based on a comparison of the expected MVs with the image-based MVs; and upon a determination that at least a portion of the stream of the image data fails the predetermined assurance level, transmit or implement a system response.

In a further aspect, embodiments of the inventive concepts disclosed herein are directed to an enhanced flight vision system. The enhanced flight vision system may include a display, a sensor configured to output a stream of image data, an aircraft state sensor configured to output aircraft state data, and at least one processor. The at least one processor may be configured to: receive the stream of image data; compute an optical flow on the stream of the image data resulting in image-based motion vectors (MVs); receive the aircraft state data; compute expected MVs based on the aircraft state data; compare the expected MVs with the image-based MVs; determine whether at least some of the stream of the image data fails a predetermined assurance level based on a comparison of the expected MVs with the image-based MVs; and upon a determination that at least a portion of the stream of the image data fails the predetermined assurance level, transmit or implement a system response.

In a further aspect, embodiments of the inventive concepts disclosed herein are directed to a method. The method may include: receiving a stream of image data; computing an optical flow on the stream of the image data resulting in image-based motion vectors (MVs); receiving aircraft state data; computing expected MVs based on the aircraft state data; comparing the expected MVs with the image-based MVs; determining whether at least some of the stream of the image data fails a predetermined assurance level based on a comparison of the expected MVs with the image-based MVs; and upon a determination that at least a portion of the stream of the image data fails the predetermined assurance level, transmitting or implementing a system response.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
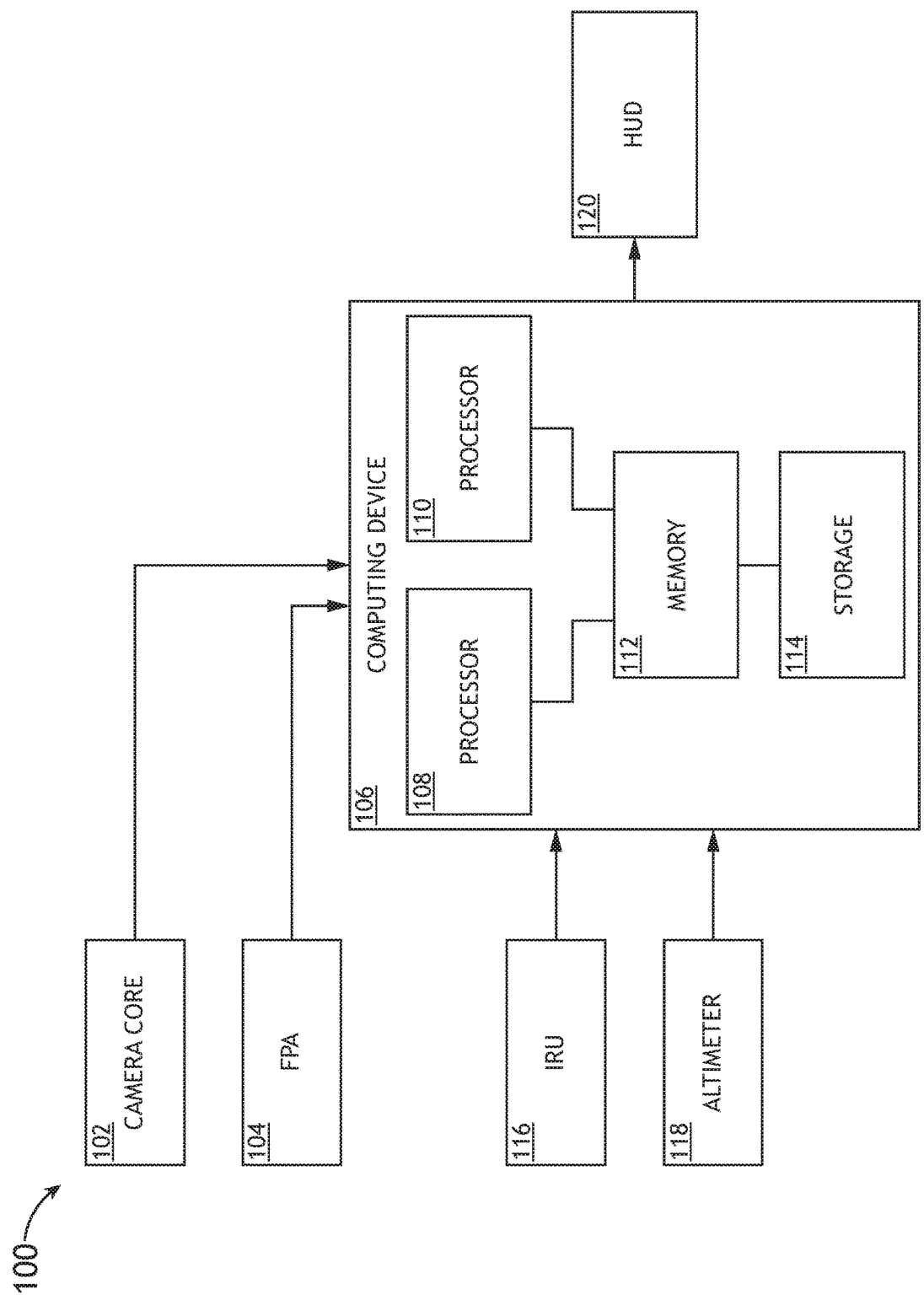
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to inertially monitor components (e.g., camera cores, focal plane arrays (FPAs), and/or processors (e.g., graphics processing units (GPUs), field-programmable gate arrays (FPGAs), and/or application-specific integrated circuits (ASICs))), such as components of an enhanced flight visions system (EFVS), a synthetic vision system (SVS), or a combined vision system (CVS), with high integrity to detect hazardously misleading information of images and/or image sub-regions of an image stream.

In some embodiments, visual systems may present information via a visual image stream. Image-based MVs may be extracted from the sequence of images (similar to video compression codecs: MPEG-2, MPEG-4, and h.264). Additionally, expected MVs may be computed based on independent, high integrity inertial and position data, such as provided by equipment on aircraft (e.g., an inertial reference unit (IRU), a global positioning system (GPS) device, an air data computer (ADC) and an altimeter). Further, the sequences of image-based MVs may be compared against the expected MVs. In some embodiments, such monitoring may be beneficial in low-visibility EFVS, SVS, or CVS conditions where only a small portion of the image may have content.

Images can be monitored by computing a frame-global flight path vector (FPV), which is calculated from image-based MVs and by comparing against an IRU sensed flight path. However, in low visibility situations, image content may not produce sufficient usable MVs to compute an accurate image-based FPV position.

Some embodiments allow monitoring in conditions of limited block-local MVs, which allows for independent image monitoring with sparse image content. This method may use the aircraft state-based FPV to calculate expected MVs for the image. These expected MVs may be compared with image-based MVs for image monitoring. This solution may obviate the need for a large quantity and distribution of image-based MVs, as this solution may only compare available image-based MVs with expected MVs, rather than using those image-based MVs to calculate a single global FPV position. Such embodiments may also require less computational power.

Referring now to FIG. 1, an exemplary embodiment of a system 100 according to the inventive concepts disclosed herein is depicted. In some embodiments, the system 100 may be implemented as a vehicle (e.g., an aircraft), a vehicular system (e.g., an aircraft system), and/or a vision system (e.g., an EFVS, an SVS, or a CVS). The system 100 may include at least one image generator (e.g., an SVS, a CVS, and/or at least one sensor (e.g., at least one camera core 102 and/or at least one FPA 104)), at least one computing device 106, at least one aircraft state sensor (e.g., at least one IRU 116, at least one altimeter 118, at least one ADC, and/or at least one global positioning system (GPS) device), and at least one display (e.g., at least one HUD 120), some or all of which may be communicatively coupled at a given time.

The at least one image generator (e.g., an SVS, a CVS, and/or the at least one sensor (e.g., the at least one camera core 102 and/or the at least one FPA 104)) may be configured to output at least one stream of image data to the computing device 106. The stream of image data may correspond to captured images of an environment of the system 100.

The at least one aircraft state sensor (e.g., at least one IRU 116, at least one altimeter 118 (e.g., at least one radio altimeter), at least one ADC, and/or at least one global positioning system (GPS) device) may be configured to output aircraft state data to the computing device 106. The aircraft state data may include information of inertial movement, position, altitude, and/or an FPV. In some embodiments, if the system 100 utilizes an altitude based on an ADC or GPS device, then a database may be accessed to determine a height above runway.

The computing device 106 may include at least one processor (e.g., at least one processor 108 and/or at least one processor 110), at least one memory 112, and at least one storage device 114, some or all of which may be communicatively coupled at any given time. The at least one processor (e.g., at least one processor 108 and/or at least one processor 110) may be communicatively coupled to the at least one image generator (e.g., an SVS, a CVS, and/or the at least one sensor (e.g., at least one camera core 102 and/or at least one FPA 104)), the at least one aircraft state sensor (e.g., at least one IRU 116, at least one altimeter 118, at least one ADC, and/or at least one global positioning system (GPS) device), and the at least one display (e.g., at least one HUD 120) via at least one data bus, such as an avionics data bus, Aeronautical Radio INC. (ARINC) 429, Avionics Full-Duplex Switched Ethernet (AFDX), Ethernet, military standard MIL-STD-1553, and/or Firewire. In some embodiments, the at least one processor 108 may be implemented as at least one general purpose processor. In some embodiments, the at least one processor 110 may be implemented as at least one of: at least one graphics processing unit (GPU), at least one field-programmable gate array (FPGA), or at least one application specific integrated circuit (ASIC). The at least one processor (e.g., at least one processor 108 and/or at least one processor 110) may be configured to collectively perform any or all of the operations disclosed throughout.

In some embodiments, the at least one processor (e.g., at least one processor 108 and/or at least one processor 110) may be configured to collectively perform: receive the stream of image data; compute an optical flow on the stream of the image data resulting in image-based MVs; receive the aircraft state data; filter the image-based MVs based at least on at least one of: a presence or an absence of image content in a sub-region of an image frame, or adjacent image-based MVs, wherein the adjacent image-based MVs are adjacent in at least one of time or space; compute expected MVs based on the aircraft state data; compare the expected MVs with the image-based MVs; determine whether at least some of the stream of the image data fails a predetermined assurance level based on a comparison of the expected MVs with the image-based MVs; upon a determination that at least a portion of the stream of the image data fails the predetermined assurance level, transmit or implement a system response; and/or output at least part of the stream of the image data to the display (e.g., the HUD 120) for presentation to a user (e.g., a pilot).

In some embodiments, the at least one processor being configured to compute an optical flow on the stream of the image data resulting in image-based MVs includes the at least one processor being configured to compute an optical flow on the stream of the image data on a sub-region (e.g., block) by sub-region (e.g., block) basis resulting in image-based MVs.

In some embodiments, the at least one processor being configured to compare the expected MVs with the image-based MVs includes the at least one processor being configured to compare the expected MVs with the image-based MVs by comparing at least one of a direction (e.g., angle) or a magnitude (e.g., length) for each of the expected MVs with at least one of a direction or a magnitude of a corresponding image-based MV.

In some embodiments, the at least one processor being configured to determine whether the at least some of the stream of the image data fails the predetermined assurance level based on the comparison of the expected MVs with the image-based MVs includes the at least one processor being configured to determine whether the at least some of the stream of the image data fails the predetermined assurance level based on the comparison of the expected MVs with the image-based MVs by determining whether any image-based motion vector of any sub-region of any image frame deviates beyond a predetermined acceptable level of tolerance from a corresponding expected MV. For example, it may not be necessary for the image-based MV and the expected MV to be exactly equal in order to "pass" a block's MV. For example, the image-based MV and the expected MV may deviate within a predetermined acceptable tolerance (e.g. a tolerance ±1.0° and ±2 pixels) and still pass. If the image-based MV and the aircraft state-based MV are within a certain tolerance of each other, that block's content may be considered good; otherwise, a fault may be detected.

In some embodiments, the at least one processor being configured to determine whether the at least some of the stream of the image data fails the predetermined assurance level based on the comparison of the expected MVs with the image-based MVs includes the at least one processor being configured to determine whether the at least some of the stream of the image data fails the predetermined assurance level based on the comparison of the expected MVs with the image-based MVs by performing a statistical analysis to determine whether a predetermined threshold percentage of sub-regions of an image frame fails the predetermined assurance level. For example, statistical analysis can be performed, such that a certain fraction of the blocks' MVs must "pass" in order for the entire frame to be considered good. Conversely, a certain fraction (e.g., different from the passing fraction, but not necessarily) may be failed before considering the whole frame bad. In some embodiments, the fraction is taken of the number of blocks containing image content as some blocks may have no content (e.g., imaging the sky or a dense cloud).

In some embodiments, an image sub-region of the stream of the image data fails the predetermined assurance level if, over a predetermined amount of time, a predetermined threshold number of deviations occur, each of the deviations being an image-based MV for the image sub-region deviating beyond a predetermined acceptable level of tolerance from a corresponding expected MV. For example, pass/fail may additionally be filtered based on time. For example, a block may be failed after two consecutive (in time) failures.

In some embodiments, the at least one processor being configured to, upon the determination that the at least the portion of the stream of the image data fails the predetermined assurance level, transmit or implement the system response includes the at least one processor being configured to, upon the determination that the at least the portion of the stream of the image data fails the predetermined assurance level, remove at least one full image frame from the stream of the image data. For example, the at least one processor may be configured to remove a complete image or output a command to the display to remove the complete image.

In some embodiments, the at least one processor being configured to, upon the determination that the at least the portion of the stream of the image data fails the predetermined assurance level, transmit or implement the system response includes the at least one processor being configured to, upon the determination that the at least the portion of the stream of the image data fails the predetermined assurance level, remove at least one image sub-region from the stream of the image data. For example, a failed block may not be displayed.

In some embodiments, the at least one processor being configured to, upon the determination that the at least the portion of the stream of the image data fails the predetermined assurance level, transmit or implement the system response includes the at least one processor being configured to, upon the determination that the at least the portion of the stream of the image data fails the predetermined assurance level, remove at least one image sub-region and at least one spatially adjacent image sub-region from the stream of the image data. For example, a failed block and neighboring blocks may not be displayed.

Figure 3:
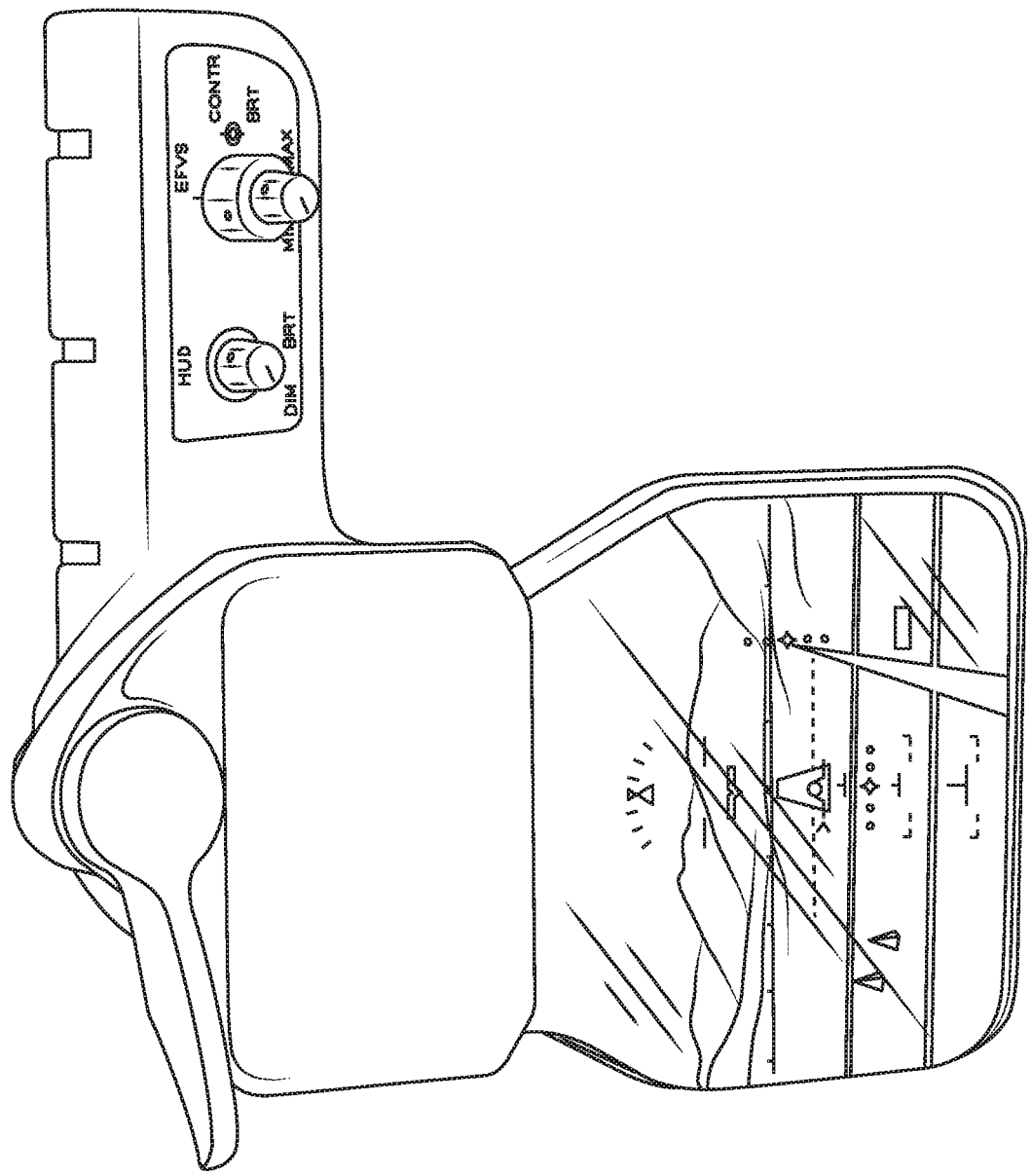
FIG. 3 is a view of the head-up display (HUD) of the system of FIG. 1 according to the inventive concepts disclosed herein.

The HUD 120 may be configured to receive image data from the at least one processor and to present images to a user (e.g., a pilot). In some embodiments, the HUD may be implemented as an EFVS, SVS, or CVS HUD configured to present EFVS, SVS, or CVS images to a pilot, as shown in FIG. 3.

Figure 2:
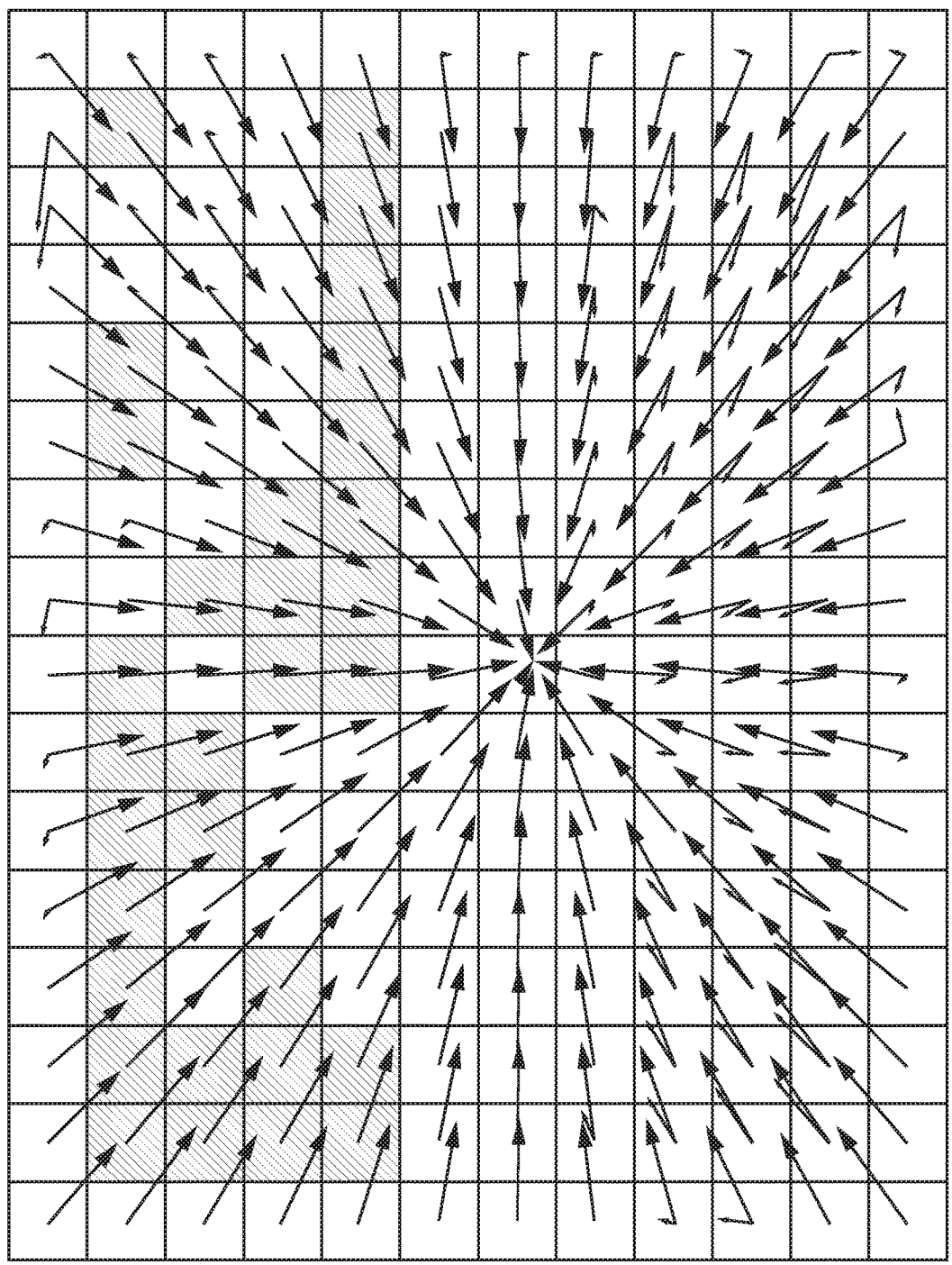
FIG. 2 is a view of an exemplary embodiment of an image frame including image sub-regions and motion vectors according to the inventive concepts disclosed herein.

Referring now to FIG. 2, an exemplary embodiment of an image frame including image sub-regions and overlain with MVs according to the inventive concepts disclosed herein is depicted. The image frame may be captured by the at least one image generator (e.g., an SVS, a CVS, and/or the at least one sensor (e.g., the at least one camera core 102 and/or the at least one FPA 104)). The image frame may be segmented into a plurality of sub-regions (e.g., blocks). Blocks where no image content was detected are exemplarily shown as shaded. The depicted MVs include expected MVs and image-based MVs. The expected MVs computed based on aircraft-state data are exemplarily shown as all converging at a single point within the image frame. The image-based MVs are exemplarily shown with varying lengths and angles across the image frame.

Figure 4:
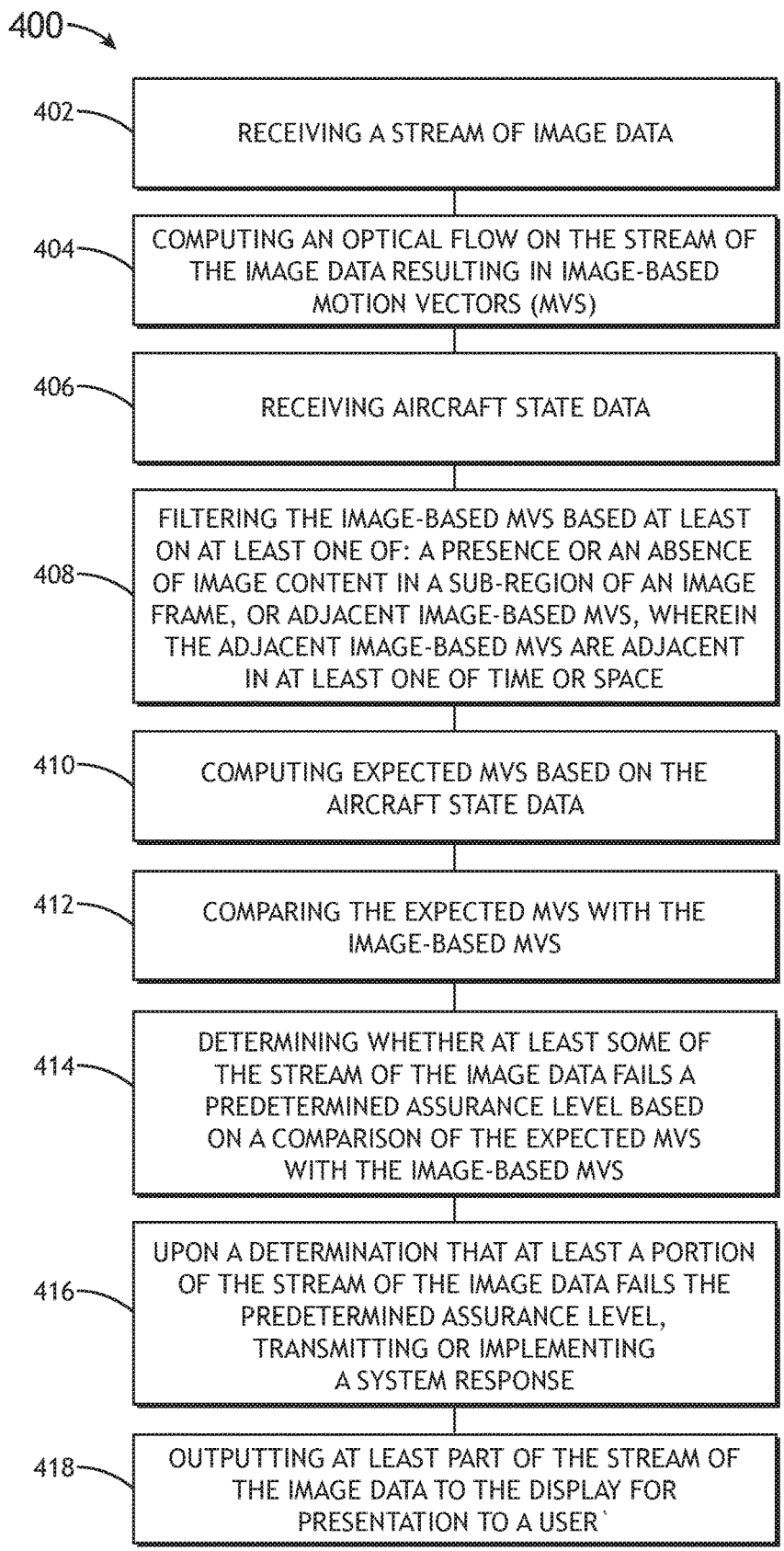
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

A step 402 may include receiving a stream of image data. For example, the step 402 may be performed by the at least one processor (e.g., at least one processor 108 and/or at least one processor 110).

A step 404 may include computing an optical flow on the stream of the image data resulting in image-based motion vectors (MVs). For example, the step 404 may be performed by the at least one processor 110.

A step 406 may include receiving aircraft state data. For example, the step 406 may be performed by the at least one processor (e.g., at least one processor 108 and/or at least one processor 110).

A step 408 may include filtering the image-based MVs based at least on at least one of: a presence or an absence of image content in a sub-region of an image frame, or adjacent image-based MVs, wherein the adjacent image-based MVs are adjacent in at least one of time or space. For example, the step 408 may be performed by the at least one processor (e.g., at least one processor 108 and/or at least one processor 110).

A step 410 may include computing expected MVs based on the aircraft state data. For example, the step 410 may be performed by the at least one processor 108.

A step 412 may include comparing the expected MVs with the image-based MVs. For example, the step 412 may be performed by the at least one processor 108.

A step 414 may include determining whether at least some of the stream of the image data fails a predetermined assurance level based on a comparison of the expected MVs with the image-based MVs. For example, the step 414 may be performed by the at least one processor 108.

A step 416 may include upon a determination that at least a portion of the stream of the image data fails the predetermined assurance level, transmitting or implementing a system response. For example, the step 416 may be performed by the at least one processor 108.

A step 418 may include outputting at least part of the stream of the image data to the display for presentation to a user. For example, the step 418 may be performed by the at least one processor (e.g., at least one processor 108 and/or at least one processor 110).

Further, the method 400 may include any of the operations disclosed throughout.

As will be appreciated from the above, embodiments of the inventive concepts disclosed herein may be directed to a system and a method configured to inertially monitor components with high integrity to detect hazardously misleading information of images and/or image sub-regions of an image stream.

As used throughout and as would be appreciated by those skilled in the art, "at least one non-transitory computer-readable medium" may refer to as at least one non-transitory computer-readable medium (e.g., memory 112, storage 114, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display;
at least one image generator configured to output a stream of image data;
at least one aircraft state sensor configured to output aircraft state data; and
at least one processor configured to:
receive the stream of image data;
compute an optical flow on the stream of the image data resulting in image-based motion vectors (MVs);
receive the aircraft state data;
compute expected MVs based on the aircraft state data;
compare the expected MVs with the image-based MVs;
determine whether at least some of the stream of the image data fails a predetermined assurance level based on a comparison of the expected MVs with the image-based MVs; and upon a determination that at least a portion of the stream of the image data fails the predetermined assurance level, transmit or implement a system response, wherein the at least one processor being configured to determine whether the at least some of the stream of the image data fails the predetermined assurance level based on the comparison of the expected MVs with the image-based MVs comprises the at least one processor being configured to determine whether the at least some of the stream of the image data fails the predetermined assurance level based on the comparison of the expected MVs with the image-based MVs by performing a statistical analysis to determine whether a predetermined threshold percentage of sub-regions of an image frame fails the predetermined assurance level.

2. The system of claim 1, wherein the at least one processor is further configured to output at least part of the stream of the image data to the display for presentation to a user.

3. The system of claim 1, wherein the at least one processor being configured to compute the optical flow on the stream of the image data resulting in the image-based MVs comprises the at least one processor being configured to compute the optical flow on the stream of the image data on a sub-region by sub-region basis per image frame resulting in the image-based MVs.

4. The system of claim 1, wherein the at least one processor is further configured to filter the image-based MVs based at least on at least one of: a presence or an absence of image content in a sub-region of an image frame, or adjacent image-based MVs, wherein the adjacent image-based MVs are adjacent in at least one of time or space.

5. The system of claim 1, wherein the at least one processor being configured to compare the expected MVs with the image-based MVs comprises the at least one processor being configured to compare the expected MVs with the image-based MVs by comparing at least one of a direction or a magnitude for each of the expected MVs with at least one of a direction or a magnitude of a corresponding image-based MV.

6. The system of claim 1, wherein the at least one processor being configured to determine whether the at least some of the stream of the image data fails the predetermined assurance level based on the comparison of the expected MVs with the image-based MVs comprises the at least one processor being configured to determine whether the at least some of the stream of the image data fails the predetermined assurance level based on the comparison of the expected MVs with the image-based MVs by determining whether any image-based motion vector of any sub-region of any image frame deviates beyond a predetermined acceptable level of tolerance from a corresponding expected MV.

7. The system of claim 1, wherein an image sub-region of the stream of the image data fails the predetermined assurance level if, over a predetermined amount of time, a predetermined threshold number of deviations occur, each of the deviations corresponding to an image-based MV for the image sub-region deviating beyond a predetermined acceptable level of tolerance from a corresponding expected MV.

8. The system of claim 1, wherein the at least one processor being configured to, upon the determination that the at least the portion of the stream of the image data fails the predetermined assurance level, transmit or implement the system response comprises the at least one processor being configured to, upon the determination that the at least the portion of the stream of the image data fails the predetermined assurance level, remove at least one full image frame from the stream of the image data.

9. The system of claim 1, wherein the at least one processor being configured to, upon the determination that the at least the portion of the stream of the image data fails the predetermined assurance level, transmit or implement the system response comprises the at least one processor being configured to, upon the determination that the at least the portion of the stream of the image data fails the predetermined assurance level, remove at least one image sub-region from the stream of the image data.

10. The system of claim 1, wherein the at least one processor being configured to, upon the determination that the at least the portion of the stream of the image data fails the predetermined assurance level, transmit or implement the system response comprises the at least one processor being configured to, upon the determination that the at least the portion of the stream of the image data fails the predetermined assurance level, remove at least one image sub-region and at least one spatially adjacent image sub-region from the stream of the image data.

11. The system of claim 1, wherein the at least one image generator includes at least one camera core.

12. The system of claim 1, wherein the at least one image generator includes at least one focal plane array.

13. The system of claim 1, wherein the at least one aircraft state sensor includes at least one inertial reference unit (IRU).

14. The system of claim 1, wherein the at least one aircraft state sensor includes at least one of: at least one radio altimeter, at least one global positioning system (GPS) device, or at least one air data computer (ADC).

15. The system of claim 1, wherein the at least one processor comprises at least one general purpose processor and at least one of: at least one graphics processing unit (GPU), at least one field-programmable gate array (FPGA), or at least one application specific integrated circuit (ASIC).

16. The system of claim 1, wherein the display is a head-up display (HUD).

17. The system of claim 1, wherein the aircraft state data includes information of a flight path vector (FPV).

18. An enhanced flight vision system, comprising:
a display;
at least one image generator configured to output a stream of image data;
at least one aircraft state sensor configured to output aircraft state data; and
at least one processor configured to:
receive the stream of image data;
compute an optical flow on the stream of the image data resulting in image-based motion vectors (MVs);
receive the aircraft state data;
compute expected MVs based on the aircraft state data;
compare the expected MVs with the image-based MVs;
determine whether at least some of the stream of the image data fails a predetermined assurance level based on a comparison of the expected MVs with the image-based MVs; and
upon a determination that at least a portion of the stream of the image data fails the predetermined assurance level, transmit or implement a system response,
wherein the at least one processor being configured to determine whether the at least some of the stream of the image data fails the predetermined assurance level based on the comparison of the expected MVs with the image-based MVs comprises the at least one processor being configured to determine whether the at least some of the stream of the image data fails the predetermined assurance level based on the comparison of the expected MVs with the image-based MVs by performing a statistical analysis to determine whether a predetermined threshold percentage of sub-regions of an image frame fails the predetermined assurance level.

19. A method, comprising:

receiving a stream of image data;

computing an optical flow on the stream of the image data resulting in image-based motion vectors (MVs);

receiving aircraft state data;

computing expected MVs based on the aircraft state data;

comparing the expected MVs with the image-based MVs;

determining whether at least some of the stream of the image data fails a predetermined assurance level based on a comparison of the expected MVs with the image-based MVs; and upon a determination that at least a portion of the stream of the image data fails the predetermined assurance level, transmitting or implementing a system response, wherein determining whether the at least some of the stream of the image data fails the predetermined assurance level based on the comparison of the expected MVs with the image-based MVs comprises determining whether the at least some of the stream of the image data fails the predetermined assurance level based on the comparison of the expected MVs with the image-based MVs by performing a statistical analysis to determine whether a predetermined threshold percentage of sub-regions of an image frame fails the predetermined assurance level.

* * * * *